United States Patent [19]

Baney et al.

[11] Patent Number: 4,859,843
[45] Date of Patent: Aug. 22, 1989

[54] METHOD AND APPARATUS FOR OPTICAL SIGNAL ANALYSIS USING A GATED MODULATION SOURCE AND AN OPTICAL DELAY CIRCUIT TO ACHIEVE A SELF-HOMODYNE RECEIVER

[75] Inventors: Douglas M. Baney, Santa Rosa; Wayne V. Sorin, Mountain View, both of Calif.

[73] Assignee: Hewlett-Packard Company, Palo Alto, Calif.

[21] Appl. No.: 146,915

[22] Filed: Jan. 22, 1988

[51] Int. Cl.$^4$ .................................................. H01J 5/16
[52] U.S. Cl. ................................... 250/227; 324/77 K
[58] Field of Search ........................... 250/227, 231 R; 455/610, 612; 324/77 K; 356/73.1, 345

[56] References Cited

U.S. PATENT DOCUMENTS 4,725,774  2/1988  Davis et al. ...................... 324/77 K
4,768,880  9/1988  Tur et al. ............................ 250/227
4,777,433 10/1988  Steele et al. ...................... 324/77 K Primary Examiner—David C. Nelms
Attorney, Agent, or Firm—William C. Milks, III

[57] ABSTRACT

An actual optical field spectrum is mixed down to baseband and can be observed directly to measure the optical field spectrum of an optical signal based on a local oscillator approach. This local oscillator approach is achieved without adding an additional local oscillator. A single optical source, such as a laser, is controlled by a modulation source for selectively modulating the optical signal produced by the optical source. Accordingly, the optical signal produced by the optical source alternates between two states, namely, an unmodulated state and a modulated state which carries the optical field spectrum of interest. Preferably, the optical signal produced by the optical source is routed to an optical conduit in parallel with an optical delay line. Although the two states of the optical signal produced by the optical source occur sequentially in time, they are mixed together concurrently after being channeled through the parallel optical circuit comprising the optical conduit and the optical delay line. The unmodulated state of the optical signal produced by the optical source serves as a local oscillator signal. The parallel combination of the optical conduit and the optical delay line together with a photodetector functions as a self-homodyne receiver when fed the unmodulated and modulated states of the optical signal produced by the optical source. The self-homodyned mixing of the unmodulated and modulated states of the optical signal produced by the optical source serves to frequency-translate the optical power spectrum to within the bandwidth of an analyzer, such as a microwave spectrum analyzer.

28 Claims, 4 Drawing Sheets

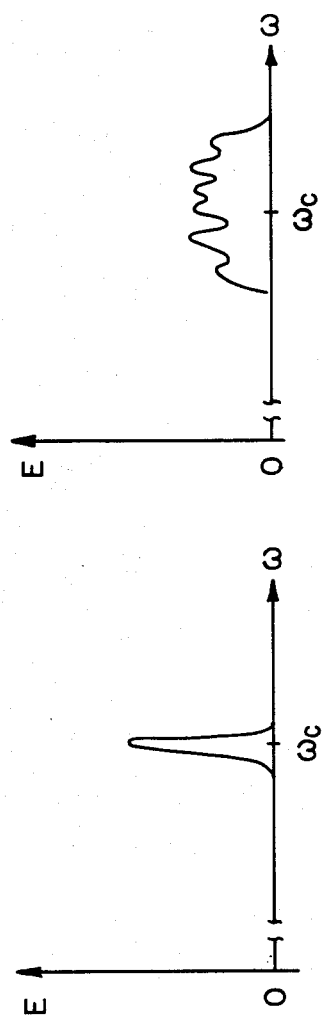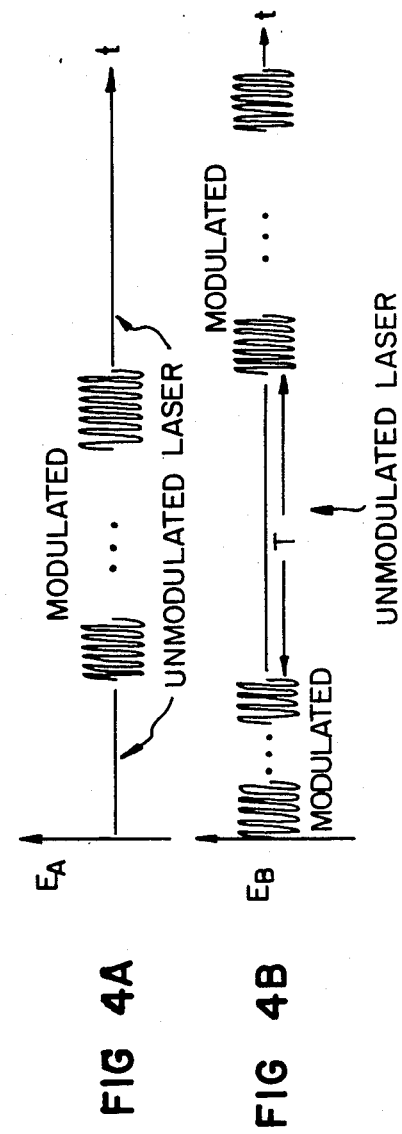

METHOD AND APPARATUS FOR OPTICAL SIGNAL ANALYSIS USING A GATED MODULATION SOURCE AND AN OPTICAL DELAY CIRCUIT TO ACHIEVE A SELF-HOMODYNE RECEIVER

BACKGROUND OF THE INVENTION

This invention relates to optical spectrum analysis and, more particularly, to measurement of the spectrum of a modulated optical signal. Specifically, the invention is directed to a method and apparatus for measurement of the spectrum of a modulated optical signal using a gated modulation source and a self-homodyne detection method based on the use of an optical delay circuit for recovering the optical field spectrum on a modulated optical signal.

The power spectrum of an optical source determines the performance of any optical device, such as a fiber optic system or associated component, that operates on that source. For example, if a laser transmitter feeds into an optical fiber cable for a link to an optical receiver elsewhere in a fiber optic system, the power spectrum of the laser determines the amount of pulse distortion due to dispersion in the optical fiber and thus the effectiveness of the communication link.

Various techniques for measuring this power spectrum are known. Unfortunately, they all have limitations and/or disadvantages in performing power spectrum measurements.

One known technique involves the use of a grating spectrometer. However, in practice, resolution requirements often exceed those possible with a grating spectrometer.

Other known techniques employ Fabry Perot, Mach Zehnder, or Michelson discriminators. However, the presence of AM confuses measurements performed with these discriminators.

Another known technique utilizes a scanning Fabry Perot spectrometer. However, this spectrometer has limited dynamic frequency range if operated over a wide spectral band.

Finally, a technique for synthetic heterodyne interferometry for semiconductor laser spectral analysis is disclosed in Abitbol, C., Gallion, P., Nakajima, H., and Chabran, C.: "Analyse la Largeur Spectrale d'un Laser Semiconducteur par Interferometrie Heterodyne Synthetique," *J. Optics* (Paris), 1984, Vol. 15, No. 6, pp. 411–418. The laser is frequency shift keyed by superimposing a small amplitude square-wave signal on a bias injection current. The optical field is analyzed by an unbalanced Mach Zehnder single-mode fiber interferometer which includes an optical delay circuit. A detector at the output of the interferometer acts as an optical product detector. Unfortunately, the modulation is constrained to be a square wave, and the modulation rate is tied to the delay in the optical circuit, so that the square wave has a period of twice the delay.

SUMMARY OF THE INVENTION

In accordance with a preferred embodiment of the invention, a method and apparatus are provided based on a local oscillator approach so that the actual optical field spectrum is mixed down to baseband and can be observed directly. Preferably, the method and apparatus of the invention achieve this local oscillator approach without adding an additional local oscillator.

One embodiment in accordance with the invention provides direct measurement of the optical field spectrum of an optical signal. The method and apparatus of the invention use only a single optical source, such as a laser, controlled by a modulation source for selectively modulating the optical signal produced by the optical source. Accordingly, the optical signal produced by the optical source alternates between two states, namely, an unmodulated state and a modulated state which carries the optical field spectrum of interest.

Preferably, the optical signal produced by the optical source is routed to an optical conduit in parallel with an optical delay line. The time duration of each state equals the delay of the optical delay line or an integer fraction thereof. Although the two states of the optical signal produced by the optical source occur sequentially in time, they are mixed together concurrently after being channeled through the parallel optical circuit comprising the optical conduit and the optical delay line. The unmodulated state of the optical signal produced by the optical source serves as a local oscillator signal. The parallel combination of the optical conduit and the optical delay line together with a photodetector functions as a self-homodyne receiver when fed the unmodulated and modulated states of the optical signal produced by the optical source. The self-homodyned mixing of the unmodulated and modulated states of the optical signal produced by the optical source serves to frequency-translate the optical power spectrum to within the bandwidth of an analyzer, such as a microwave spectrum analyzer.

The method and apparatus of the invention are essentially wavelength independent (limited only by detectors and fiber components >300 nm). Additionally, no tracking of an additional local oscillator is required. Furthermore, unlike known optical spectrum analysis systems, including the one disclosed in the aforementioned Abitbol, et al., article, high frequency modulation is applied when the modulation source is gated on by a gate function to provide gated modulation of the optical signal produced by the optical source, i.e., there is modulation under the gate function. This modulation can be at any frequency greater than the gate frequency, rather than the modulation rate being tied to the delay of the optical delay line.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 3, comprising FIGS. 3A and 3B, shows frequency spectra for an unmodulated optical signal (FIG. 3A) and a corresponding modulated optical signal (FIG. 3B);

FIGS. 4A and 4B illustrate an optical signal produced by an optical source included in the optical spectrum analysis system shown in FIG. 1 as alternating between two states, namely, an unmodulated state (FIG. 4A), which serves as a local oscillator signal, and a modulated state (FIG. 4B), which carries the optical field spectrum of interest;

DETAILED DESCRIPTION OF THE PREFERRED EMBODIMENTS

The invention allows direct measurement of the optical field spectrum on an optical signal. A single optical source, such as a laser, is used to frequency-translate the optical power spectrum to within the bandwidth of an analyzer, such as a microwave spectrum analyzer. This is achieved by alternating, or switching, the optical signal produced by the optical source between two states, namely, an unmodulated state, which is used in lieu of a local oscillator signal, and a modulated state, which carries the optical field spectrum of interest, and by mixing these states in a self-homodyne receiver which includes an optical delay circuit.

Figure 1:
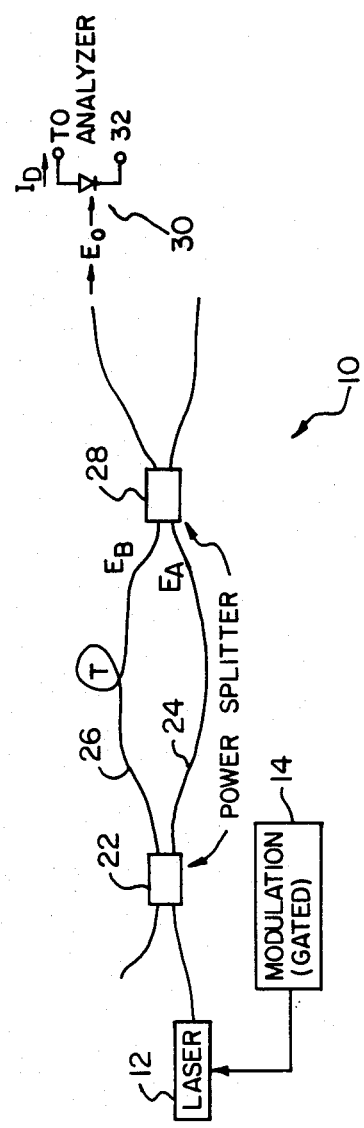
FIG. 1 is a schematic diagram of an optical spectrum analysis system in accordance with one embodiment of the invention.

Considered in more detail, FIG. 1 is a schematic diagram of an optical spectrum analysis system in accordance with one embodiment of the invention, generally indicated by the numeral 10. The optical spectrum analysis system 10 comprises an optical source 12 for producing an optical signal. The optical source 12 can be, for example, a laser, such as a DFB laser.

Figure 2:
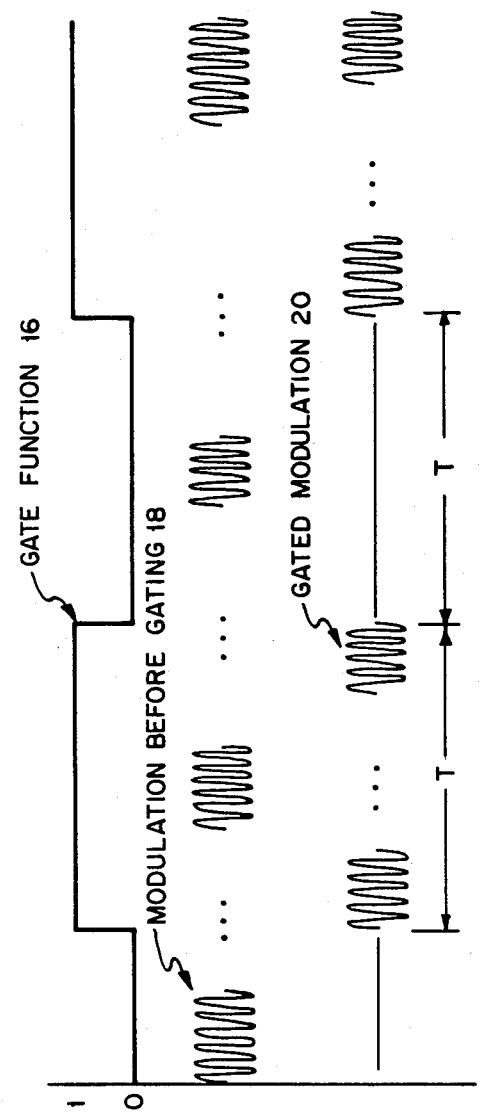
FIG. 2 illustrates a signal produced by a gated modulation source included in the optical spectrum analysis system shown in FIG. 1.

In accordance with the invention, the optical spectrum analysis system 10 further comprises a modulation source 14 connected to the optical source 12. The modulation source 14 is preferably a gated modulator which produces bursts of modulation. Accordingly, as shown in FIG. 2, the modulation source 14 generates a gate function 16 which is employed as a trigger signal to gate a modulation signal 18, thereby producing a gated modulation signal 20. The modulation signal 18 on which the gate function 16 is superimposed can be continuous wave, pulse, pseudorandom bit sequence (PRBS), or other type of modulation. The gated modulation signal 20 preferably has a 50% duty cycle and a period 2T, as shown in FIG. 2. The relationship between the frequency of modulation and gate frequency is:

$$f_m > f_{GATE}$$

The gated modulation signal 20 produced by the modulation source 14 modulates the optical signal produced by the optical source 12. As shown in FIG. 3, the optical signal produced by the optical source 12 alternates between two states, namely, an unmodulated state, as shown in FIG. 3A, and a modulated state which carries the optical field spectrum of interest, as shown in FIG. 3B.

Referring again to FIG. 1, the optical spectrum analysis system 10 further comprises a first optical power splitter 22 connected to the optical source 12. The optical spectrum analysis system 10 also comprises an optical conduit 24, whose input is connected to the first optical power splitter 22, and an optical delay line 26, whose input is also connected to the first optical power splitter. The optical conduit 24 can be optical fiber cable or, alternatively, the atmosphere, i.e., free space. Preferably, the optical delay line 26 comprises a predetermined length of optical fiber cable. The relationship between gate frequency and the predetermined time delay of the optical delay line 26 is:

$$f_{GATE} \cdot T = n + \tfrac{1}{2}, \text{ where } n = 0, 1, 2 \ldots$$

The output of the optical conduit 24 and the output of the optical delay line 26 are connected to a second optical power splitter 28 also included in the optical spectrum analysis system 10. Therefore, the optical conduit 24 and the optical delay line 26 are connected in a parallel optical circuit.

The optical spectrum analysis system 10 further comprises a photodetector 30. For example, the photodetector 30 can be a photodiode. Preferably, the detection bandwidth of the photodetector 30 is wider than the AM and FM bandwidths. Finally, the optical spectrum analysis system 10 preferably comprises an analyzer 32, such as a microwave spectrum analyzer or RF spectrum analyzer.

The combination of the first optical power splitter 22, optical conduit 24, optical delay line 26, second optical power splitter 28, and photodetector 30 forms a self-homodyne receiver in response to the alternately unmodulated and modulated optical signal produced by the optical source 12 shown in FIG. 3, as will now be described. The unmodulated optical signal produced by the optical source 12 is used in lieu of a local oscillator signal.

Let $E_A(t)$ be the optical signal which passes through the optical conduit 24 and $E_B(t)$ be the optical signal which passes through the optical delay line 26. An illustration of $E_A(t)$ appears in FIG. 4A and of $E_B(t)$ appears in FIG. 4B. $E_A(t)$ and $E_B(t)$ alternately serve as the local oscillator signal and the modulated optical signal.

As a result of the splitting and recombining of the alternately unmodulated and modulated optical signal produced by the optical source 12 in the first and second optical power splitters 22 and 28, the field $E_O$ is composed of two parts, one due to the modulated optical signal produced by the optical source and another due to the unmodulated optical signal. Therefore, the signal current ID in the photodetector 30 is proportional to:

$$E_A(t)^2 + E_B(t)^2 + 2[E_A(t) \cdot E_B(t)]$$

The first two terms represent optical intensity modulation. The last term gives the spectral information of interest.

As an example, if for a time T, as shown in FIG. 4, $E_A(t)$ is the unmodulated optical signal produced by the optical source 12 currently serving as the local oscillator signal, and $E_B(t)$ is the modulated optical signal with both AM and FM imparted on it, then the third term (which is proportional to $E_A(t) \cdot E_B(t)$) in the above expression effectively represents the mixing between the equivalent of a local oscillator signal and the unknown signal. This results in a measurement whose resolution is a function of the unmodulated linewidth of the optical source 12, such as a laser, and the interferometer transfer function of the optical conduit 24 and the optical delay line 26.

The optical spectrum analysis system 10 can directly measure the chirp a laser undergoes during IM modulation. The laser modulation is preferably gated by a square wave of period twice the differential delay of the optical circuit. When the gate function 16 is on, modulated signal is allowed to pass to the laser. Thus, the result is that two optical beams, one unmodulated and the other modulated, are mixed, thereby yielding a term associated with laser chirp directly.

For example, as DFB semiconductor lasers become more commonplace in optical communication systems, there exists a growing need for their accurate characterization. Measurements of linewidth and small frequency deviations have been demonstrated by taking advantage of the long delays achievable using fiber optic circuits. See Okoshi, T., Kikuchi, K., and Nakayama, A.: "Novel Method for High Resolution Measurement of Laser Output Spectrum," *Electron. Lett.*, 1980, Vol. 16, pp. 630-631, and Ryu, S., and Yamamoto, S.: "Measurement of Direct Frequency Modulation Characteristics of DFB-LD by Delayed Self-Homodyne Technique," *Electron. Lett.*, 1986, Vol. 22, pp. 1052-1054.

Another important measurement, useful in determining the dispersion over a fiber link, is that of the spectrum of the optical field of a current modulated DFB laser. The method and apparatus in accordance with the invention use the optical delay line 26 combined with gated modulation to measure the homodyne power spectrums of both the optical field and intensity of a DFB laser under normal operating conditions.

In accordance with the method and apparatus of the invention, the mixing of a modulated DFB laser with a CW local oscillator is achieved with a single laser by using gated modulation combined with an appropriate optical delay to perform frequency chirp measurements up to +/−22 GHz. Detecting the mixed optical signal with a wide bandwidth analyzer 32 (i.e., optical detector, preamplifier, and microwave spectrum analyzer) allows direct observation of frequency chirps.

Considered in more detail, a DFB laser provides the optical source 12 and is switched between two states of operation, each state lasting a time T. In one state, the laser operates as a CW local oscillator. In the other state, any desired AC-coupled modulation can be applied to the laser. The time T is assumed to be much longer than the period of the modulation.

The laser signal is then fed to the first optical power splitter 22 and, hence, to the parallel optical circuit comprising the optical conduit 24 and the optical delay line 26, whose differential time delay T results in the continuous addition of the modulated and unmodulated laser states in the second power splitter 28. This circuit together with the photodetector 30 effectively acts as an optical homodyne receiver where a modulated laser signal is mixed with a CW local oscillator signal, but without the constraint of requiring two separate lasers.

The resulting power spectrum of the output photocurrent is composed of two components. The first is a direct feedthrough term associated with the gated intensity modulation of the laser. The second term is the result of optical mixing between the unmodulated and modulated laser states. This second term provides for the direct observation of the frequency excursions on the optical signal produced by the laser. In practice, these two terms are easily distinguished, since the intensity modulation terms are spectrally narrow, while the terms associated with the optical FM spectrum are broadened due to the laser linewidth.

Actual measurements on a DFB laser have been performed using the optical spectrum analysis system 10 shown in FIG. 1. The output of a Toshiba DFB laser (Model TOLD 300s, threshold current=14.4 mA) operating at 1.32 um was fed through two isolators (not shown) before being coupled into the first power splitter 22. The delay difference (>3 usec) was much longer than the coherence time of the DFB laser (linewidth >20 MHz).

The signal produced by the photodetector 30 was fed to the analyzer 32, for example, a calibrated 100 kHz to 22 GHz microwave spectrum analyzer, such as a Model HP71400A Lightwave Signal Analyzer available from Hewlett-Packard Company, Signal Analysis Division, Rohnert Park, California, comprising a high-speed InGaAs detector, microwave preamplifier, and microwave spectrum analyzer. The bandwidth of the electrical detection system was 22 GHz (+/−0.12 nm at 1.3 um), which is well matched to typical frequency excursions attainable with DFB lasers.

The DFB laser was measured under both sinusoidal and PRBS modulation. To help prevent thermally induced frequency chirps, the modulation source 14 was AC-coupled so that the average current to the laser remained constant during both halves of the gate period.

Figure 5A:
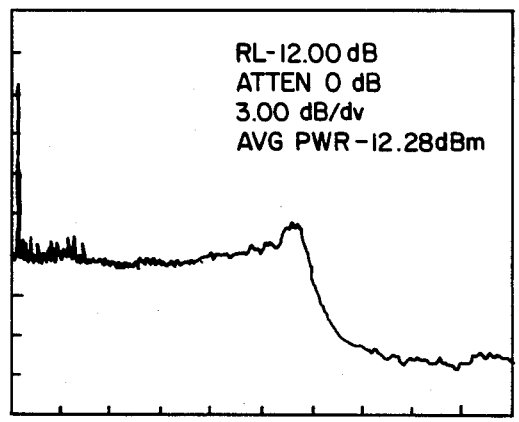
FIGS. 5A and 5B show a microwave spectrum analyzer output for sinusoidal modulation, $f_m = 100$ MHz, $m = 83\%$ (FIG. 5A), and NRZ pseudorandom bit sequence (PRBS), $f_c = 350$ MHz, $m = 20\%$, length $= 2^7 - 1$ (FIG. 5B), in tests on a DFB laser.
Figure 5B:
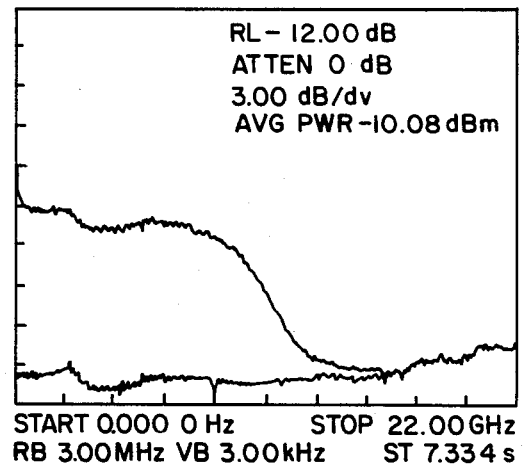

FIG. 5 shows the power spectrum of the photocurrent in the photodetector 30 for the cases of sinusoidal and PRBS modulation. For the sinusoidal case (FIG. 5A), the modulation frequency was 100 MHz, the DC bias current was 36 mA, and the modulation index was approximately 83%. The resulting frequency chirp of the laser was approximately +/−13 GHz, which corresponds to an FM modulation index of approximately 130. The discrete spectral components below 3 GHz are due to the direct feedthrough of the intensity modulation at the fundamental (100 MHz) and its various harmonics generated by non-linearities of the laser. For the PRBS case (FIG. 5B), the clock frequency was 350 MHz, the bias current was 50 mA, the modulation depth was about 20%, and the code sequence was NRZ (length=$2^7-1$). The more gradual roll-off of the FM frequency chirp, compared to sinusoidal modulation, is believed to be due to the wider frequency spectrum of the PRBS modulation. The bottom trace in FIG. 5B is the noise floor of the analyzer 32 with the optical signal blocked.

Figure 6:
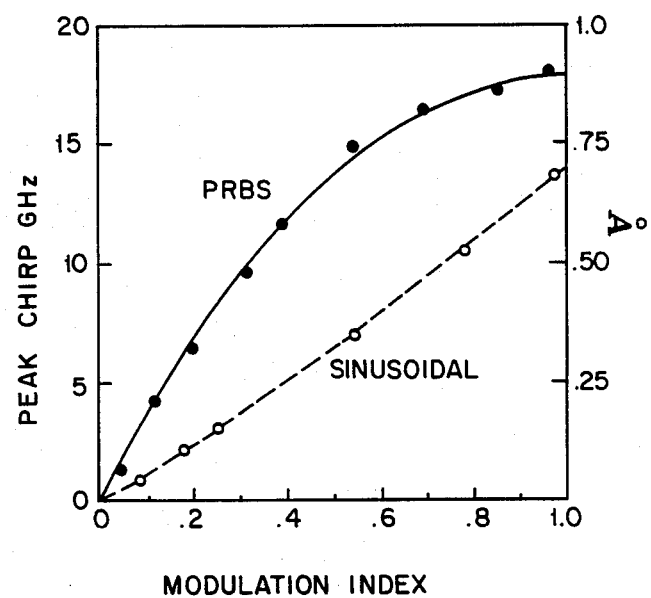
FIG. 6 shows the relationship between maximum frequency chirp (at 1.32 um) and modulation depth for sinusoidal ($f_m = 300$ MHz) and PRBS ($f_c = 365$ MHz) modulation in tests on a DFB laser.

FIG. 6 shows plots of maximum frequency chirp versus modulation index of the DFB laser. The modulation rates for both curves were similar (i.e., sinusoidal=300 MHz, PRBS=365 MHz).

Accordingly, the method and apparatus in accordance with the invention can directly measure the homodyne power spectrum of the optical field for a modulated DFB laser. Various other uses will also appear to persons skilled in the art.

The foregoing description is offered primarily for purposes of illustration. It will be readily apparent to those skilled in the art that numerous modifications and variations not mentioned above can still be made without departing from the spirit and scope of the invention as claimed below.

What is claimed is:

1. A method for directly measuring the optical field spectrum of an optical signal based on a local oscillator approach for mixing down the actual optical field spectrum to baseband, comprising the steps of:
   providing an optical source;
   providing a modulation source for selectively modulating the optical signal produced by the optical source so that the optical signal produced by the optical source alternates between (a) an unmodulated state and (b) a modulated state which carries the optical field spectrum of interest;

routing the optical signal produced by the optical source to an optical circuit for providing delayed and undelayed states of the optical signal;

recombining the states of the optical signal produced by the optical source together concurrently after being channeled through the optical circuit;

the unmodulated state of the optical signal produced by the optical source serving as a local oscillator signal; and mixing the recombined states of the optical signal produced by the optical source;

thereby providing self-homodyne mixing in response to the unmodulated and modulated states of the optical signal produced by the optical source.

2. The method of claim 1 wherein the optical source is a laser.

3. The method of claim 1 wherein the optical circuit has a differential delay between the delayed and undelayed states of the optical signal and the time duration of each state equals the differential delay of the optical circuit.

4. The method of claim 1 wherein the optical circuit has a differential delay between the delayed and undelayed states of the optical signal and the time duration of each state equals an integer fraction of the differential delay of the optical circuit.

5. The method of claim 1 wherein high frequency modulation is applied to the optical signal produced by the optical source when the modulation source is gated on by a gate function to provide gated modulation of the optical signal produced by the optical source.

6. The method of claim 5 wherein the optical circuit has a differential delay between the delayed and undelayed states of the optical signal and the modulation is at any frequency greater than the gate frequency and the modulation rate is not tied to the differential delay of the optical circuit.

7. The method of claim 1 wherein the step of mixing the recombined states of the optical signal produced by the optical source comprises mixing the recombined states of the optical signal produced by the optical source in a photodetector.

8. The method of claim 7 wherein the self-homodyned mixing of the unmodulated and modulated states of the optical signal produced by the optical source frequency-translates the optical power spectrum to within the bandwidth of an analyzer.

9. The method of claim 8 wherein the analyzer is a microwave spectrum analyzer.

10. An optical spectrum analysis system, comprising:
an optical source for producing an optical signal;
a modulation source connected to the optical source, the modulation source for generating a gate function employed as a trigger signal to gate a modulation signal applied to the optical signal produced by the optical source, thereby producing a gated modulation signal for modulating the optical signal produced by the optical source so that the optical signal produced by the optical source alternates between (a) an unmodulated state and (b) a modulated state which carries an optical field spectrum of interest;
a first optical power splitter connected to the optical source for splitting the alternately unmodulated and modulated optical signal produced by the optical source;
an optical conduit having an input and an output, the input of the optical conduit being connected to the first optical power splitter;
an optical delay line having an input and an output and a predetermined time delay, the input of the optical delay line also being connected to the first optical power splitter;
a second optical power splitter for recombining the alternately unmodulated and modulated optical signal produced by the optical source;
the output of the optical conduit and the output of the optical delay line being connected to the second optical power splitter;
whereby the unmodulated optical signal produced by the optical source is used in lieu of a local oscillator signal.

11. The system of claim 10 wherein the optical source is a laser.

12. The system of claim 10 wherein the modulation source is a gated modulator which produces bursts of modulation.

13. The system of claim 10 wherein the modulation signal on which the gate function is superimposed is continuous wave modulation.

14. The system of claim 10 wherein the optical circuit has a differential delay between an optical signal output from the optical conduit and the optical signal output from the optical delay line and the gated modulation signal has a 50% duty cycle and a period twice the differential delay of the optical circuit.

15. The system of claim 10 wherein the relationship between the frequency of modulation and gate frequency of $f_m > f_{GATE}$.

16. The system of claim 10 wherein the optical conduit is optical fiber cable.

17. The system of claim 10 wherein the optical delay line comprises a predetermined length of optical fiber cable.

18. The system of claim 10 wherein the relationship between gate frequency and the predetermined time delay of the optical delay line is $f_{GATE} \cdot T = n + \frac{1}{2}$, where $n = 0, 1, 2 \ldots$.

19. The system of claim 10, further comprising a photodetector, the combination of the first optical power splitter, optical conduit, optical delay line, second optical splitter, and photodetector forming a self-homodyne receive in response to the alternately unmodulated and modulated optical signal produced by the optical source.

20. The system of claim 19 wherein the photodetector is a photodiode.

21. The system of claim 19 wherein the detection bandwidth of the photodetector is wider than the AM and FM bandwidths imparted on the optical signal.

22. The system of claim 19 wherein, for a time T, $E_A(t)$ is the unmodulated optical signal produced by the optical source currently serving as the local oscillator signal and $E_B(t)$ is the modulated optical signal with both AM and FM imparted on it, the signal current $I_D$ in the photodetector being proportional to $E_A(t)^2 + E_B(t)^2 + 2[E_A(t) \cdot E_B(t)]$, the term $E_A(t) \cdot E_B(t)$ effectively representing the mixing between the equivalent of a local oscillator signal and the unknown signal and gives the spectral information of interest.

23. The system of claim 19, further comprising an analyzer for displaying the power spectrum of the optical signal.

24. The system of claim 23 wherein the analyzer is a microwave spectrum analyzer.

25. The system of claim 23 wherein the analyzer is an RF spectrum analyzer.

26. The system of claim 10 wherein the modulation signal on which the gate function is superimposed is pulse modulation.

27. The system of claim 10 wherein the modulation signal on which the gate function is superimposed is pseudorandom bit sequence modulation.

28. The system of claim 10 wherein the optical conduit is the atmosphere.

* * * * *